United States Patent
Nielsen

(10) Patent No.: US 11,245,839 B2
(45) Date of Patent: *Feb. 8, 2022

(54) METHODS AND APPARATUS TO CAPTURE IMAGES

(71) Applicant: The Nielsen Company (US), LLC, New York, NY (US)

(72) Inventor: Christen V. Nielsen, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,935

(22) Filed: May 20, 2020

(65) Prior Publication Data

US 2020/0351436 A1 Nov. 5, 2020

Related U.S. Application Data

(63) Continuation of application No. 16/196,810, filed on Nov. 20, 2018, now abandoned, which is a
(Continued)

(51) Int. Cl.
| | |
|---|---|
| G06K 9/00 | (2006.01) |
| H04N 5/232 | (2006.01) |
| G06K 9/20 | (2006.01) |
| H04H 60/45 | (2008.01) |
| H04N 21/4223 | (2011.01) |

(Continued)

(52) U.S. Cl.
CPC ..... *H04N 5/23219* (2013.01); *G06K 9/00228* (2013.01); *G06K 9/00288* (2013.01); *G06K 9/00369* (2013.01); *G06K 9/00778* (2013.01); *G06K 9/2027* (2013.01); *H04H 60/45* (2013.01); *H04N 5/2256* (2013.01); *H04N 5/33* (2013.01); *H04N 5/347* (2013.01);
(Continued)

(58) Field of Classification Search
CPC ............. H04N 5/23219; H04N 5/2256; H04N 21/4223; H04N 21/4415; H04N 21/44218; G06K 9/2027; G06K 9/00288; G06K 9/00778; G06K 9/00369; H04H 60/45
USPC .................................................. 382/118, 100
See application file for complete search history.

(56) References Cited

U.S. PATENT DOCUMENTS

| | | |
|---|---|---|
| 6,014,461 A | 1/2000 | Hennessey et al. |
| 7,440,593 B1 | 10/2008 | Steinberg et al. |

(Continued)

OTHER PUBLICATIONS

Wikipedia. (Dec. 2010) "Kinect." http://en.wikipedia.org/wiki/Kinect, 15 pages.

(Continued)

*Primary Examiner* — Amandeep Saini
(74) *Attorney, Agent, or Firm* — Hanley, Flight & Zimmerman, LLC

(57) ABSTRACT

Methods and apparatus to capture images are disclosed. An example device disclosed herein includes an image sensor to observe a first image of a face and a logic circuit. The logic circuit is to determine whether the face in the first image is in a first orientation with respect to the image sensor. When the face in the first image is in the first orientation, the logic circuit is trigger the image sensor to capture a second image of the face, and perform a facial recognition process on the second image, but not on the first image.

20 Claims, 5 Drawing Sheets

Related U.S. Application Data continuation of application No. 15/793,108, filed on Oct. 25, 2017, now Pat. No. 10,165,177, which is a continuation of application No. 15/419,120, filed on Jan. 30, 2017, now Pat. No. 9,843,717, which is a continuation of application No. 14/732,175, filed on Jun. 5, 2015, now Pat. No. 9,560,267, which is a continuation of application No. 13/327,227, filed on Dec. 15, 2011, now Pat. No. 9,082,004.

(51) Int. Cl.
*H04N 21/4415* (2011.01)
*H04N 21/442* (2011.01)
*H04N 5/225* (2006.01)
*H04N 5/33* (2006.01)
*H04N 5/347* (2011.01)

(52) U.S. Cl.
CPC ..... *H04N 21/4223* (2013.01); *H04N 21/4415* (2013.01); *H04N 21/44218* (2013.01)

(56) References Cited

U.S. PATENT DOCUMENTS

| | | | |
|---|---|---|---|
| 7,602,524 | B2 | 10/2009 | Eichhorn et al. |
| 7,636,456 | B2 | 12/2009 | Collins et al. |
| 7,676,065 | B2 | 3/2010 | Wiedemann et al. |
| 7,697,735 | B2 | 4/2010 | Adam et al. |
| 7,796,154 | B2 | 9/2010 | Senior et al. |
| 7,899,209 | B2 | 3/2011 | Greiffenhagen et al. |
| 8,620,088 | B2 | 12/2013 | Lee |
| 9,082,004 | B2 | 7/2015 | Nielsen |
| 9,560,267 | B2 | 1/2017 | Nielsen |
| 10,165,177 | B2 | 12/2018 | Nielsen |
| 2003/0093784 | A1 | 5/2003 | Dimitrova et al. |
| 2006/0062429 | A1 | 3/2006 | Ramaswamy et al. |
| 2006/0133699 | A1 | 6/2006 | Widrow et al. |
| 2007/0150916 | A1 | 6/2007 | Begole et al. |
| 2007/0154063 | A1 | 7/2007 | Breed |
| 2007/0263934 | A1 | 11/2007 | Ojima et al. |
| 2008/0232650 | A1 | 9/2008 | Suzuki et al. |
| 2008/0271065 | A1 | 10/2008 | Buonasera et al. |
| 2009/0091650 | A1* | 4/2009 | Kodama ............... H04N 5/232 348/333.11 |
| 2009/0177528 | A1 | 7/2009 | Wu et al. |
| 2009/0310829 | A1* | 12/2009 | Baba ................ G06K 9/00248 382/118 |
| 2010/0245567 | A1 | 9/2010 | Krahnstoever et al. |
| 2011/0019924 | A1 | 1/2011 | Elgersma et al. |
| 2011/0169953 | A1 | 7/2011 | Sandler et al. |
| 2011/0265110 | A1 | 10/2011 | Weinblatt |
| 2011/0285845 | A1 | 11/2011 | Bedros et al. |
| 2013/0156273 | A1 | 6/2013 | Nielsen |
| 2015/0271390 | A1 | 9/2015 | Nielsen |
| 2017/0142330 | A1 | 5/2017 | Nielsen |
| 2018/0048807 | A1 | 2/2018 | Nielsen |
| 2019/0089894 | A1 | 3/2019 | Nielsen |

OTHER PUBLICATIONS

Fellers et al. (Aug. 2004) "Nikon MicroscopyU: Interactive Java Tutorials-CCD Signal-to-Noise Ratio." http://www.microscopyu.com/tutorials/java/digitalimaging/signaltonoise/index.html as archived by The Internet Archive, www.archive.org., 4 pages.

United States Patent and Trademark Office, "Non-Final Office Action," issued in connection with U.S. Appl. No. 13/327,227, dated May 20, 2014, 26 pages.

United States Patent and Trademark Office, "Final Office Action," issued in connection with U.S. Appl. No. 13/327,227, dated Sep. 18, 2014, 21 pages.

United States Patent and Trademark Office, "Notice of Allowance," issued in connection with U.S. Appl. No. 13/327,227, dated Mar. 6, 2015, 20 pages.

United States Patent and Trademark Office, "Requirement for Restriction/Election," issued in connection with U.S. Appl. No. 14/732,175, dated Jul. 8, 2016, 8 pages.

United States Patent and Trademark Office, "Notice of Allowance," issued in connection with U.S. Appl. No. 14/732,175, dated Sep. 23, 2016, 35 pages.

United States Patent and Trademark Office, "Notice of Allowance," issued in connection with U.S. Appl. No. 15/419,120, dated Aug. 2, 2017, 28 pages.

United States Patent and Trademark Office, "Notice of Allowance," issued in connection with U.S. Appl. No. 15/793,108, dated Aug. 23, 2018, 25 pages.

United States Patent and Trademark Office, "Non-Final Office action," issued in connection with U.S. Appl. No. 15/793,108, dated Mar. 2, 2018, 25 pages.

United States Patent and Trademark Office, "Advisory action," issued in connection with U.S. Appl. No. 16/196,810, dated May 13, 2020, 7 pages.

United States Patent and Trademark Office, "Final Office action," issued in connection with U.S. Appl. No. 16/196,810, dated Feb. 26, 2020, 26 pages.

United States Patent and Trademark Office, "Non-Final Office action," issued in connection with U.S. Appl. No. 16/196,810, dated Nov. 7, 2019, 20 pages.

United States Patent and Trademark Office, "Advisory action," issued in connection with U.S. Appl. No. 16/196,810, dated Aug. 22, 2019, 6 pages.

United States Patent and Trademark Office, "Final Office action," issued in connection with U.S. Appl. No. 16/196,810, dated Jun. 13, 2019, 19 pages.

United States Patent and Trademark Office, "Non-Final Office action," issued in connection with U.S. Appl. No. 16/196,810, dated Mar. 1, 2019, 33 pages.

* cited by examiner

METHODS AND APPARATUS TO CAPTURE IMAGES

RELATED APPLICATIONS

This patent arises from a continuation of U.S. patent application Ser. No. 16/196,810, filed Nov. 20, 2018, which arises from a continuation of U.S. patent application Ser. No. 15/793,108, filed Oct. 25, 2017, now U.S. Pat. No. 10,165, 177, which arises from a continuation of U.S. patent application Ser. No. 15/419,120, filed Jan. 30, 2017, now U.S. Pat. No. 9,843,717, which arises from a continuation of U.S. patent application Ser. No. 14/732,175, filed Jun. 5, 2015, now U.S. Pat. No. 9,560,267, which arises from a continuation of U.S. patent application Ser. No. 13/327,227, filed Dec. 15, 2011, now U.S. Pat. No. 9,082,004. U.S. patent application Ser. No. 16/196,810, U.S. patent application Ser. No. 15/793,108, U.S. patent application Ser. No. 15/419, 120, U.S. patent application Ser. No. 14/732,175 and U.S. patent application Ser. No. 13/327,227 are hereby incorporated herein by reference in their entirety. Priority to U.S. patent application Ser. No. 16/196,810, U.S. patent application Ser. No. 15/793,108, U.S. patent application Ser. No. 15/419,120, U.S. patent application Ser. No. 14/732,175 and U.S. patent application Ser. No. 13/327,227 is claimed.

FIELD OF THE DISCLOSURE

This disclosure relates generally to audience measurement and, more particularly, to methods and apparatus to capture images.

BACKGROUND

Audience measurement of media content (e.g., broadcast television and/or radio, stored audio and/or video content played back from a memory such as a digital video recorder or a digital video disc, audio and/or video content played via the Internet, video games, etc.) often involves collection of content identifying data (e.g., signature(s), fingerprint(s), embedded code(s), channel information, time of consumption information, etc.) and people data (e.g., identifiers, demographic data associated with audience members, etc.). The content identifying data and the people data can be combined to generate, for example, media exposure data indicative of amount(s) and/or type(s) of people that were exposed to specific piece(s) of media content.

In some audience measurement systems, the collected people data includes an amount of people being exposed to media content. To calculate the amount of people being exposed to the media content, some measurement systems capture a series of images of a media exposure environment (e.g., a television room, a family room, a living room, a bar, a restaurant, etc.) and analyze the images to determine how many people appear in the images at a particular date and time. The calculated amount of people in the media exposure environment can be correlated with media content being presented at the particular date and time to provide exposure data (e.g., ratings data) for that media content. Additionally, some audience measurement systems identify people in the images via one or more identification techniques such as, for example, facial recognition.

DETAILED DESCRIPTION

Figure 1:
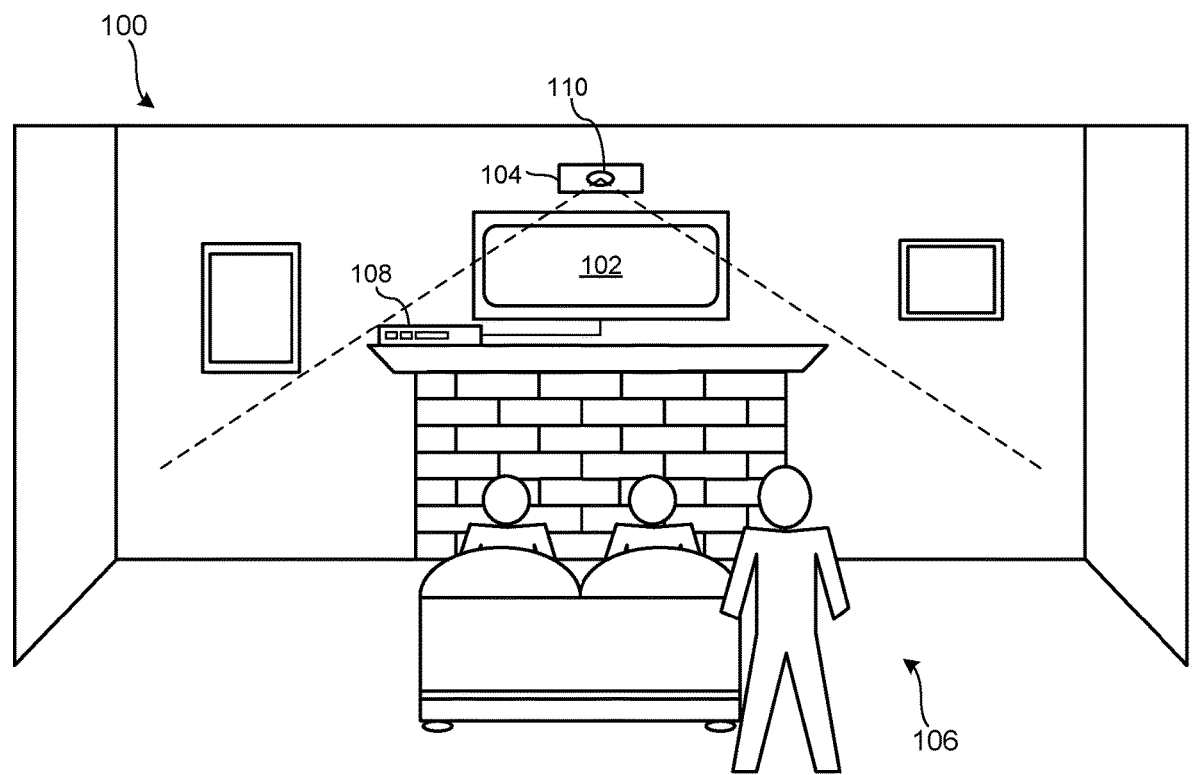
FIG. 1 is an illustration of an example exposure environment including an example audience measurement device disclosed herein.

To count people in a media exposure environment, such as a room of a house in which a television is located, some audience measurement systems attempt to recognize objects as humans in a series of captured images of the room. A tally is maintained for each frame of image data to reflect an amount of people in the room at a time corresponding to a respective frame. That is, each recognition of an object as a human in a frame increases the tally associated with that frame. The audience measurement system counting the people in the room may also collect content identifying information to identify media content being presented (e.g., aurally and/or visually) in the room. With the identification of the media content and the amount of people in the room at a given date and time, the audience measurement system is aware of how many people were exposed to the specific media content.

Additionally, some systems recognize an identity of one or more of the detected humans by, for example, performing a facial recognition process on image data of one or more of the frames, receiving identifier(s) from the detected humans, detecting identifying signal(s) generated by devices carried by the humans, etc. Personal identification information can be used in conjunction with the content identifying information and/or the tally information to generate exposure information related to the content. When an audience measurement system uses a facial recognition process to identify people, an accuracy of the identification increases with an increase in resolution of the image data on which the facial recognition process is performed. In other words, the higher the resolution of a frame of image data, the more likely identification made via facial recognition will be accurate.

To provide high-resolution image data, audience measurement systems that include facial recognition capabilities typically employ high-resolution image sensors equipped with an illumination source, such as an infrared (IR) light emitting diode (LED). In previous systems, each time the high-resolution image sensor captures a frame of image data, the illumination source illuminates a surrounding area. The resulting illumination provides lighting conditions favorable to capturing high-resolution image data. When the illumination source is an IR LED, the illumination source emits IR light to enable the image sensor to capture illuminated objects. In addition to the IR light, IR emitters also emit light from the visible spectrum that appears as a red glow from the emitter.

Frequent activation of the illumination sources when capturing image data represents a significant power drain for the audience measurement system. Moreover, frequent interval activation (e.g., every two seconds) of the illumination source shortens a lifetime of the illumination source. Additionally, due to significant amounts of heat generated by the illumination sources, heat sinking devices and techniques are typically needed in systems that activate the illumination sources frequently. Further, light emissions of the illumination source has the potential to annoy people such as, for example, members of a panel that are exposed to the illumination source while in the presence of the audience measurement system. In an audience measurement system utilizing an IR LED, the red glow emitted from the illumination source is a blinking red light that faces the panel members while the panel members are, for example, watching a television. This blinking red light may annoy some panel members. Annoyance of panel members is undesirable and may prove detrimental to an ability of the audience measurement system to maintain persons in the panel and/or to collect as much data as possible. That is, some audience measurement systems rely on the willing participation of panel members and, thus, reduction or elimination of annoying aspects of the system is beneficial to avoid impairing willingness to volunteer. An annoying feature of the audience measurement system may decrease panelist compliance with and/or participation in the system.

Example methods, apparatus, and articles of manufacture disclosed herein reserve use of an illumination source of a high-resolution image sensor for frames of image data designated for processing that requires high-resolution image data. Example frames designated for such processing include frames on which a facial recognition process is to be executed. For frames not designated for processing that requires high-resolution image data, example methods, apparatus, and articles of manufacture disclosed herein capture image data without the use of the illumination source. Example frames not designated for processing that requires high-resolution image data include frames on which a person count (e.g., a body count) is to be executed without recognizing an identity of the detected persons. Additionally, when image data is captured without activation of the illumination source (e.g., when the corresponding frame will not be subjected to facial recognition), example methods, apparatus, and articles of manufacture disclosed herein enhance resulting images to compensate for low light levels and loss of contrast due to lack of illumination. In particular, example methods, apparatus, and articles of manufacture disclosed herein employ a pixel binning procedure on the image data captured without use of the illumination source. Binning is the process of summing pixel values in a neighborhood of pixels (e.g., a 2×2, 3×3, 4×4, etc. area), thereby capturing more light per pixel at the cost of lower resolution. However, for example methods, apparatus, and articles of manufacture disclosed herein, the lower resolution is acceptable for the frames captured without the use of the illumination source because, as described above, those frames will not be subjected to processing that requires high-resolution data.

Accordingly, example methods, apparatus, and articles of manufacture disclosed herein selectively activate an illumination source associated with an image sensor for certain frames. In contrast, previous systems activate the illumination source for each frame captured by a corresponding image sensor. In many instances, frames not designated for high-resolution processing (e.g., frames used solely to count people) greatly outnumber the frames designated for high-resolution frame (e.g., frame used for facial recognition). In fact, as described below, a mode of an image sensor during which image data is captured without the use of the illumination source (e.g., because high-resolution image data is not necessary for the corresponding frame(s)) is referred to herein as a 'majority capture' mode. Conversely, because the number of frames requiring high-resolution image data is far less than the number of frames for which lower resolution image data is acceptable, a mode of the image sensor during which image data is captured with the use of the illumination source is referred to herein as a 'minority capture' mode.

Because the illumination source is a significant power consumer, selective activation of the illumination source provided by example methods, apparatus, and articles of manufacture disclosed herein greatly reduce power consumption levels of the image sensors of audience measurement systems. Moreover, the selective activation provided by example methods, apparatus, and articles of manufacture disclosed herein extends the operational lifetime of the image sensors of audience measurement systems by less frequently operating the corresponding illumination sources. Further, the selective activation provided by example methods, apparatus, and articles of manufacture disclosed herein reduces or even eliminates the need for heat sinking devices and/or techniques otherwise required to dissipate heat generated by the illumination sources. In addition to the reduced resource consumption provided by example methods, apparatus, and articles of manufacture disclosed herein, audience measurement methods, systems, and articles of manufacture employing the selective activation disclosed herein reduce the likelihood that panel members become irritated by light and/or glow emitted from illumination sources. As described above, illumination sources of image sensors typically face panel members in a media exposure environment (e.g., a television room) and, thus, the panel members are subjected to a blinking and/or glowing light whenever the illumination source is activated. In previous systems utilizing a high-resolution image sensor, each frame is captured with the use of the illumination source, resulting in a blinking light (e.g., red light in the case of an IR LED flash unit being used as the illumination source) or a light that is seemingly persistently on throughout operation of the system. Selectively activating the illumination source for frames requiring high-resolution image data and not activating the illumination source for other frames, as disclosed herein, considerably reduces the instances of illumination of the media exposure environment and, thus, the potential for irritating the panel members.

FIG. 1 is an illustration of an example media exposure environment 100 including a media presentation device 102 and an example audience measurement device 104 for measuring and/or identifying an audience 106 of the media presentation device 102. In the illustrated example of FIG. 1, the media exposure environment 100 is a room of a household that has been statistically selected to develop television ratings data for a population/demographic of interest. Assumingly, one or more persons of the household have registered with the system and provided this demographic information. The example audience measurement device 104 can be implemented in additional and/or alternative types of environments such as, for example, a room in a non-statistically selected household, a theater, a restaurant, a tavern, a retail location, an arena, etc. In the illustrated example of FIG. 1, the media presentation device is a television 102 coupled to a set-top box (STB) 108 that implements a digital video recorder (DVR) and a digital versatile disc (DVD) player. The example audience measurement device 104 can be implemented in connection with additional and/or alternative types of media presentation devices such as, for example, a radio, a computer monitor, a video game console and/or any other communication device able to present content to one or more individuals.

The example audience measurement device 104 of FIG. 1 utilizes a camera 110 to capture a plurality of time stamped frames of image data of the environment 100. The example camera 110 captures images within a field of view defined by the dotted lines of FIG. 1. In the example shown in FIG. 1, an image captured by the camera 110 includes each member of a three-person audience 106. The images captured by the camera 110 are used to generate people tallies representative of how many people are in the audience 106 and/or personal identifications of the people in the audience. As described in detail below, the example audience measurement device 104 of FIG. 1 also monitors the environment 100 to identify media content being presented (e.g., displayed, played, etc.) by the television 102 and/or other media presentation devices to which the audience 106 is exposed. Identification(s) of media content to which the audience 106 is exposed are correlated with the people tallies and/or the personal identifications to generate exposure data for the media content.

Figure 2:
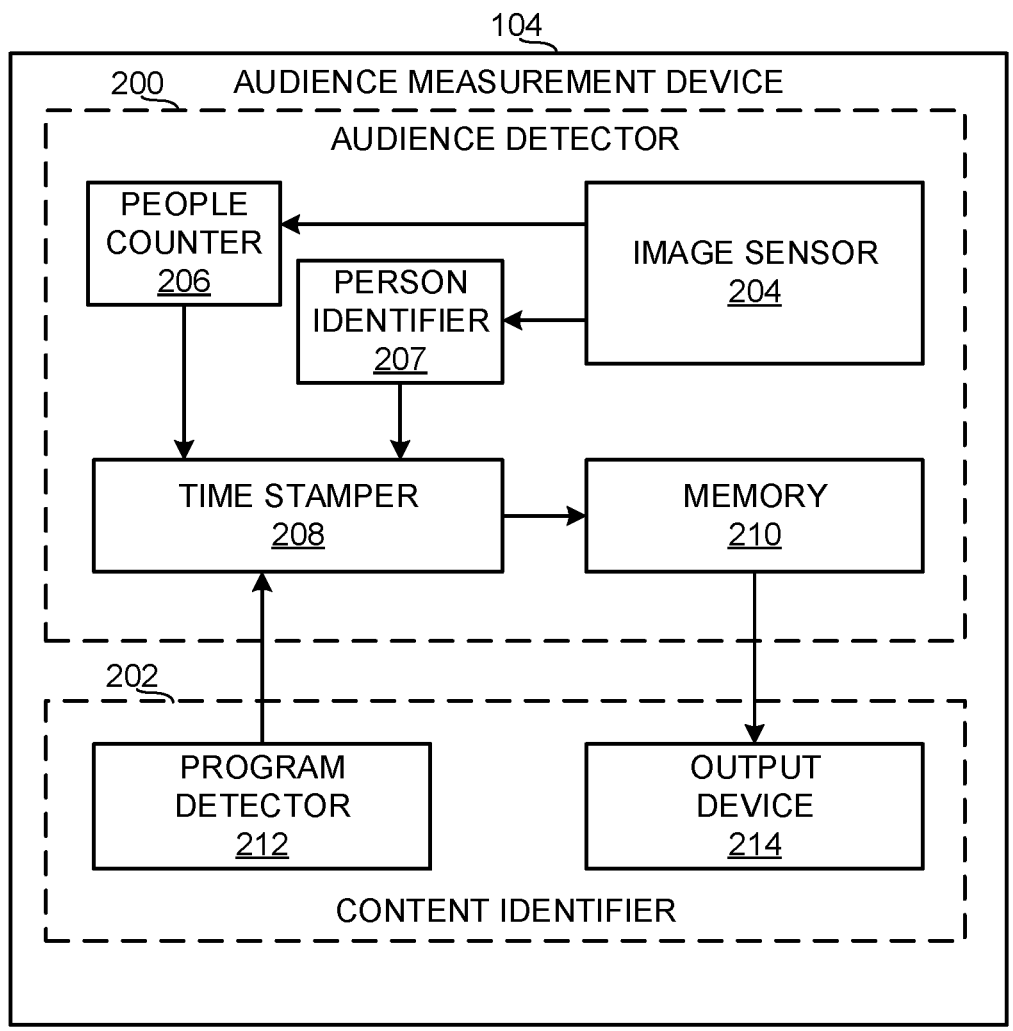
FIG. 2 is a block diagram of an example implementation of the example audience measurement device of FIG. 1.

FIG. 2 is a block diagram of an example implementation of the example audience measurement device 104 of FIG. 1. The example audience measurement device 104 of FIG. 2 includes an audience detector 200 and a content identifier 202. The example audience detector 200 includes an image sensor 204, a people counter 206, a person identifier 207, a time stamper 208, and a memory 210. The example image sensor 204 of FIG. 2 captures frames of image data of the environment 100, which includes the audience 106 being exposed to a presentation output by the media presentation device 102 of FIG. 1. In the illustrated example, the image sensor 204 is implemented by a high-resolution camera capable of capturing high-resolution image data, such as an image sensor configured to capture images at a resolution of, for example, 1920×1080 or 1280×960. In some examples, the image sensor 204 and/or the camera 110 of FIG. 1 is implemented by a gaming system, such as XBOX® Kinect®.

In the illustrated example, the frames obtained by the image sensor 204 of FIG. 2 are conveyed to the people counter 206. The example people counter 206 determines how many people appear in each of the received frames and records each of the amounts of people as a tally for each frame. The example people counter 206 can determine how many people appear in a frame in any suitable manner using any suitable technique. For example, the people counter 206 of FIG. 2 recognizes a general shape of a human body and/or a human body part, such as a head and/or torso. Additionally or alternatively, the example people counter 206 of FIG. 2 may count a number of "blobs" that appear in the frame and count each distinct blob as a person. Recognizing human shapes and counting "blobs" are illustrative examples and the people counter 206 of FIG. 2 can count people using any number of additional and/or alternative techniques. An example manner of counting people is described by Blumenthal in U.S. patent application Ser. No. 10/538,483, filed on Jun. 8, 2005, now U.S. Pat. No. 7,203,338, which is hereby incorporated herein by reference in its entirety. To track the number of detected people in a room, the example people counter 206 of FIG. 2 also tracks a position (e.g., an X-Y coordinate) of each detected person.

In the illustrated example, some frames obtained by the image sensor 204 of FIG. 2 are conveyed to the person identifier 207 in addition to or in lieu of the people counter 206. As described in greater detail below in connection with FIG. 3, the frames conveyed to the example person identifier 207 of FIG. 2 are frames designated (e.g., by the image sensor 204 and/or any other component of the audience measurement system 100) for a facial recognition procedure such that people captured in those frames can be individually identified. In some examples, the audience detector 200 may have additional or alternative methods and/or components to identify people in the frames captured by the image sensor 204, such as a feedback system to which the members of the audience 106 provide (e.g., actively and/or passively) identification to the audience measurement device 104). To identify people in the frames captured by the image sensor 204, the example person identifier 207 includes or has access to a collection (e.g., stored in a database) of facial signatures (e.g., vectors). Each facial signature corresponds to a person having a known identity to the person identifier 207. The collection includes an identifier (ID) for each known facial signature that corresponds to a known person. For example, in reference to FIG. 1, the collection of facial signatures may correspond to frequent visitors and/or members of the household associated with the room 100. The example person identifier 207 analyzes one or more regions of a frame thought to correspond to a human face and develops a pattern or map for the region(s). The pattern or map of the region represents a facial signature of the detected human face. The example person identifier 207 compares the detected facial signature to entries of the facial signature collection. When a match is found, the person identifier 207 has successfully identified at least one person in the frame. In such instances, the person identifier 207 records (e.g., in a memory address dedicated to the person identifier 207) the ID associated with the matching facial signature of the collection. When a match is not found, the person identifier 207 of the illustrated example retries the comparison or prompts the audience 106 for information that can be added to the collection of known facial signatures for the unmatched face. More than one signature may correspond to the same face (i.e., the face of the same person).

The example people counter 206 of FIG. 2 outputs the calculated tallies and/or corresponding image frames (or identifications thereof) to the time stamper 208. Also, the person identifier 207 outputs the records ID(s) for any identified persons and/or the corresponding image frames (or identifications thereof) to the time stamper 208. The time stamper 208 of the illustrated example includes a clock and a calendar. The example time stamper 208 associates a time and date with each calculated tally and/or ID and the corresponding frame by, for example, appending the time/date data to the end of the tally data, the ID(s), and/or the frame. A data package (e.g., the tally, the ID(s), the date and time, and/or the frame) is stored in the memory 210. The memory 210 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 210 may include one or more double data rate (DDR) memories, such as DDR, DDR2, DDR3, mobile DDR (mDDR), etc. The memory 210 may also include one or more mass storage devices such as, for example, hard drive disk(s), compact disk drive(s), digital versatile disk drive(s), etc.

The example content identifier 202 of FIG. 2 includes a program detector 212 and an output device 214. The example program detector 212 of FIG. 2 detects presentation(s) of media content in the media exposure environment 100 and collects identification information associated with the detected presentation(s). For example, the program detector 212, which may be in wired and/or wireless communication with the presentation device 102 and/or the STB 108 of FIG. 1, can identify a presentation time and a source of a presentation. The presentation time and the source identification data may be utilized to identify the program by, for example, cross-referencing a program guide configured, for example, as a look up table. The source identification data may, for example, be the identity of a channel obtained, for example, by monitoring a tuner of the STB 108 or a digital selection (e.g., a remote control signal) of a channel to be presented on the television 102. Additionally or alternatively, codes embedded with or otherwise broadcast with media content being presented via the STB 108 and/or the television 102 may be utilized by the program detector 212 to identify the presentation. As used herein, a code is an identifier that is transmitted with the media content for the purpose of identifying and/or tuning the corresponding media content. Codes may be carried in the audio, in the video, in metadata, in a vertical blanking interval, in a program guide, in content data, or in any other portion of the media content or the signal carrying the content. Additionally or alternatively, the program detector 212 can collect a signature representative of a portion of the media content. As used herein, a signature is a representation of some characteristic of the media content (e.g., a frequency spectrum of an audio signal). Collected signature(s) can be compared against a collection of signatures of known media content to identify the corresponding media content. The signature(s) can be collected by the program detector 212 and/or the program detector 212 can collect samples of the media content and export them to a remote site for generation of the signature(s). Irrespective of the manner in which the media content of the presentation is identified, the identification information is time stamped by the time stamper 208 and maybe stored in the memory 210.

In the illustrated example of FIG. 2, the output device 214 periodically and/or aperiodically exports the recorded data from the memory 214 to a data collection facility via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). The data collection facility of the illustrated example utilizes the people tallies generated by the people counter 206 and/or the personal IDs generated by the person identifier 207 in conjunction with the content identifying data collected by the program detector 212 to generate exposure information and/or compliance information (e.g., indications of whether or not members of a panel have behaved in accordance with term(s) of membership). Alternatively, the data analysis could be performed locally and exported via a network or the like to a data collection facility for further processing. For example, the amount of people (as counted by the people counter 206) in the exposure environment 100 at a time (as indicated by the time stamp appended to the people tally by the time stamper 208) in which a sporting event (as identified by the program detector 212) was presented by the television 102 can be used in a rating calculation for the sporting event. In some examples, additional information (e.g., demographic data associated with one or more people personally identified by the person identifier 207, geographic data, etc.) is correlated with the exposure information at the data collection facility to expand the usefulness of the data collected by the example audience measurement device 104 of FIGS. 1 and/or 2. The data collection facility of the illustrated example compiles data from many monitored exposure environments.

While an example manner of implementing the audience measurement device 104 of FIG. 1 has been illustrated in FIG. 2, one or more of the elements, processes and/or devices illustrated in FIG. 2 may be combined, divided, re-arranged, omitted, eliminated and/or implemented in any other way. Further, the example audience detector 200, the example content identifier 202, the example image sensor 204, the example people counter 206, the person identifier 207, the example time stamper 208 and/or, more generally, the example audience measurement device 104 of FIG. 2 may be implemented by hardware, software, firmware and/or any combination of hardware, software and/or firmware. Thus, for example, any of the example audience detector 200, the example content identifier 202, the example image sensor 204, the example people counter 206, the person identifier 207, the example time stamper 208 and/or, more generally, the example audience measurement device 104 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. When any of the apparatus or system claims of this patent are read to cover a purely software and/or firmware implementation, at least one of the example audience detector 200, the example content identifier 202, the example image sensor 204, the example people counter 206, the person identifier 207, the example time stamper 208, and/or the example audience measurement device 104 of FIG. 2 are hereby expressly defined to include a tangible computer readable medium such as a memory, DVD, CD, BluRay, etc. storing the software and/or firmware. Further still, the example audience measurement device 104 of FIG. 2 may include one or more elements, processes and/or devices in addition to, or instead of, those illustrated in FIG. 2, and/or may include more than one of any or all of the illustrated elements, processes and devices.

Figure 3:
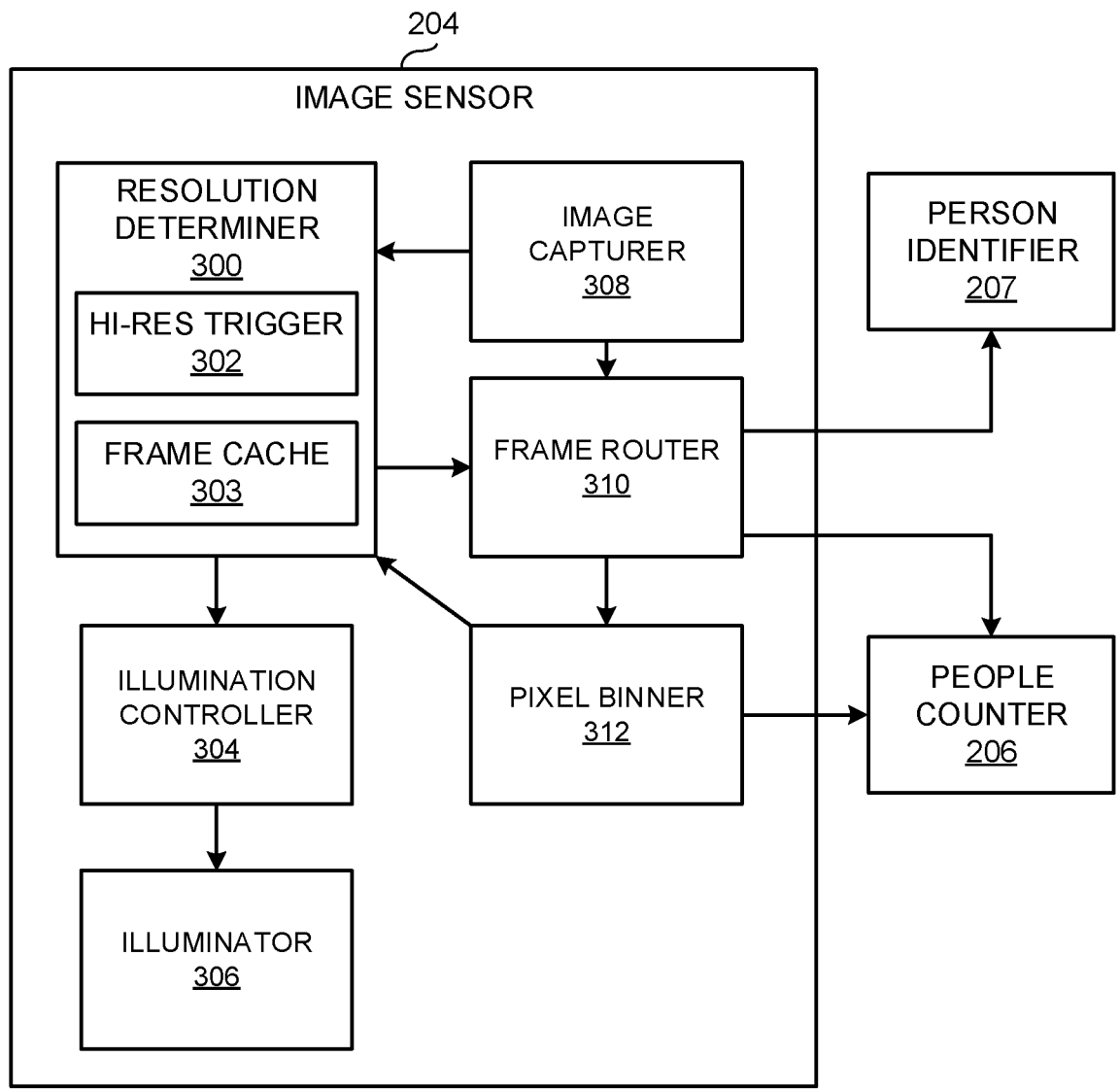
FIG. 3 is a block diagram of an example implementation of the example image sensor of FIG. 2.

FIG. 3 is a block diagram of an example implementation of the example image sensor 204 of FIG. 2. The example image sensor 204 of FIG. 3 includes a resolution determiner 300, a high-resolution (hi-res) trigger 302, a frame cache 303, an illumination controller 304, an illuminator 306, an image capturer 308, a frame router 310, and a pixel binner 312. In the illustrated example, the image sensor 204 operates in a first mode for frames not designated for processing that requires high-resolution image data. The first mode is referred to herein as a majority mode. In some examples, a default mode of the image sensor 204 is the majority mode. The example image sensor 204 also operates in a second mode for frames designated for processing that requires high-resolution image data, such as frames designated for a facial recognition process to be executed by the example person identifier 207 of FIG. 2. The second mode is referred to herein as a minority mode. The first mode is referred to as the majority mode and the second mode is referred to as a minority mode because the image sensor 204 is expected (but not necessarily) to be in the majority mode more often than the minority mode.

The resolution determiner 300 of the illustrated example determines in which mode the image sensor 204 is to operate for a given time period, an image frame and/or set of image frames. In the illustrated example of FIG. 3, the resolution determiner 300 causes the image sensor to operate in the majority mode unless the minority mode has been triggered. As described above, the minority mode is to be entered when a frame to be captured by the image capturer 308 is designated to undergo, for example, a facial recognition process. To determine when an upcoming frame or set of frames is to undergo such resolution-demanding process, the example hi-res trigger 302 references the frame cache 303. The example frame cache 303 of FIG. 3 is a memory that stores frames recently captured by the image capturer 308. The example frame cache 303 of FIG. 3 receives frames directly from the image capturer 308 and/or the pixel binner 312, which is described in detail below. The hi-res trigger 302 retrieves one or more of the recently captured frames from the frame cache 303 and analyzes the frame(s) to determine whether a shape corresponding to a human head and/or face appears in the previous frame(s). In some examples, the hi-res trigger 302 also determines whether the detected head and/or face of the previous frames is oriented such that a facial recognition process can be successfully performed on the corresponding image data. In some examples, the hi-res trigger 302 also determines a period of time during which the detected head and/or face has been in a general location (e.g., if the corresponding person is not moving from a general position in the frame). Given the results of the one or more analyses performed by the hi-res trigger 302 on the previous frame(s), the example hi-res trigger 302 of FIG. 3 determines whether succeeding frame(s) are to undergo a facial recognition process to attempt to identify the detected head(s) and/or face(s). In some examples, the hi-res trigger 302 is a clock that drives the system into the minority mode at fixed intervals. For each frame that the hi-res trigger 302 designates as a frame that will be subject to a facial recognition process (either via analysis or based on a clock), the example hi-res trigger 302 of FIG. 3 places the image sensor 204 in the minority mode. Otherwise, the example image sensor 204 of FIG. 3 operates according to the majority mode.

When the example image sensor 204 of FIG. 3 is operating in the majority mode (e.g., the hi-res trigger 302 determines that facial recognition is not to be performed on the corresponding frame(s)), the resolution determiner 300 of the illustrated example conveys an instruction or indication to the illumination controller 304 that causes the illumination controller 304 to disable the illuminator for the corresponding frame(s). In the illustrated example, the illuminator 306 is an IR LED that emits IR light to illuminate the environment 100 with IR light detectable by the image capturer 308, which includes IR capabilities. When in the majority mode, the example illumination controller 304 coordinates with the image capturer 308 to synchronize inaction of the illuminator 306 with the capture of the corresponding frame(s). Thus, the resolution determiner 300 causes the illuminator 306 to be inactive during capture of frames not designated for facial recognition processes (and/or only causes the illuminator 306 to be active during capture of frames that are designated for facial recognition processing. As described above, disabling the illuminator 306 reduces power consumption and extends the lifetime of the image sensor 204. Further, disabling the illuminator 306 reduces the heat generated by the illuminator and, thus, reduces or even eliminates the need for heat sinking devices and/or techniques. Further, when the illuminator 306 is not blinking and/or glowing (e.g., when active), members of the audience 106 are less likely to become annoyed by the image sensor 204.

When the example image sensor 204 of FIG. 3 is operating in the minority mode (e.g., the hi-res trigger 302 determines that facial recognition is to be performed on the corresponding frame(s)), the resolution determiner 300 conveys an instruction to the illumination controller 304 that causes the illumination controller 304 to enable the illuminator 306 during capture of the corresponding frame(s). The example illumination controller 304 coordinates with the image capturer 308 to synchronize operation of the illuminator 306 with the capture of the corresponding frame(s). Thus, the hi-res trigger 302 causes the illuminator 306 to be active for frames designated for facial recognition processes (e.g., by the person identifier 207). Frames may be specifically designated or may be generally designated as "frames which occur at a certain time." Accordingly, when operating in the majority mode, the illuminator 306 does not illuminate the environment 100. In contrast, when operating in the minority mode, the illuminator 306 does illuminate the environment 100.

The example image capturer 308 of FIG. 3 is a high-resolution camera that captures image data representative of the environment 100 of FIG. 1. In the illustrated example, the image capturer 308 operates similarly in the majority mode as in the minority mode. That is, the example image capturer 308 of FIG. 3 captures high-resolution image data for each captured frame. Given the selective operation of the illuminator 306 described above, the high-resolution frames captured when operating in the majority mode are likely to be poorly lit. On the other hand, the high-resolution frames captured when operating in the minority mode are well lit. The example image capturer 308 of FIG. 3 conveys all or some (e.g., only the frames captured in the minority mode) of the captured frames to the resolution determiner 300 for storage in the frame cache 303. As described above, the frames stored in the frame cache 303 are used by the example hi-res trigger 302 to identify heads and/or faces in the environment 100 that, due to their orientation, may be identifiable by the person identifier 207.

Further, the example image capturer 308 of FIG. 3 conveys the captured high-resolution frames to the frame router 310. The example frame router 310 of FIG. 3 also receives an instruction from the resolution determiner 300 indicative of the mode (e.g., majority or minority) in which the image sensor 204 is operating for the received frames. For frames designated by the resolution determiner 300 as frames captured in the minority mode, the illuminator 306 was active and, thus, the image data is of high-resolution and well lit. Accordingly, the image data captured in the minority mode is in condition for the facial recognition process. Therefore, in response to the indicator from the resolution determiner 300 that the received frame(s) were captured in the minority mode, the example frame router 310 of FIG. 3 routes the illuminated, high-resolution frames to the person identifier 207 for facial recognition process(es). In some examples, the frame router 310 also routes the high-resolution frames to the people counter 206 for counting process(es).

For frames designated by the resolution determiner 300 as frames captured in the majority mode, the illuminator 306 was inactive and, thus, the image data is of high-resolution but likely to be dark and of low contrast. For many of these frames, the contrast level is likely to be too low for proper analysis (e.g., people counting) to be accurately performed. Accordingly, the image data captured in the majority mode may not be in condition (e.g., may not have high enough contrast levels) for an accurate execution of the people counting process of the people counter 206. Therefore, in response to the instruction from the resolution determiner 300 that the received frame(s) were captured in the majority mode, the example frame router 310 of FIG. 3 routes the low-contrast frames to the pixel binner 312.

The example pixel binner 312 of FIG. 3 receives high-resolution frames of image data from the frame router 310 that are likely to be of low contrast levels due to the illuminator 306 being inactive during capture of the frames. The example pixel binner 312 of FIG. 3 performs a binning procedure on the received frames. Binning is a process in which a neighborhood of pixels (e.g., a first pixel and a number of adjacent pixels) is summed together. Example binning procedures sum pixels according to a 2×2 neighborhood of pixels, a 3×3 neighborhood of pixels, a 4×4 neighborhood of pixels, or another arrangement of pixels. In effect, the binning procedure performed by the pixel binner 312 may assign more light per orthogonal block of pixels at the cost of lower resolution. The additional light per block pixel increases the contrast levels of the image data. After the pixel procedure performed by the example pixel binner 312 of FIG. 3, the frames are of lower resolution (e.g., in comparison with the original format of the frame as captured by the high-resolution camera of the image capturer 308) but may also have higher contrast levels. Thus, the example pixel binner 312 enhances the dark, low-contrast images generated in the majority mode for processing that does not require high-resolution image data (e.g., the facial recognition process of the person identifier 207), such as the people counting process of the people counter 206. The example pixel binner 312 conveys the resulting frames of image data to the people counter 206. The higher contrast levels provided by the example pixel binner 312 may enable the people counter 206 to distinguish between shapes in the frames of image data. The example pixel binner 312 of FIG. 3 also conveys the frames of image data to the resolution determiner 300 for storage in the frame cache 303.

While an example manner of implementing the image sensor 204 of FIG. 2 has been illustrated in FIG. 3, one or more of the elements, processes and/or devices illustrated in FIG. 3 may be combined, divided, re-arranged, omitted, eliminated and/or implemented in any other way. Further, the example resolution determiner 300, the example hi-res trigger 302, the example illumination controller 304, the example frame router 310, the example pixel binner 310, and/or, more generally, the example image sensor 204 of FIG. 3 may be implemented by hardware, software, firmware and/or any combination of hardware, software and/or firmware. Thus, for example, any of the example resolution determiner 300, the example hi-res trigger 302, the example illumination controller 304, the example frame router 310, the example pixel binner 310, and/or, more generally, the example image sensor 204 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. When any of the apparatus or system claims of this patent are read to cover a purely software and/or firmware implementation, at least one of, the example resolution determiner 300, the example hi-res trigger 302, the example illumination controller 304, the example frame router 310, the example pixel binner 310, and/or the example image sensor 204 of FIG. 3 are hereby expressly defined to include a tangible computer readable medium such as a memory, DVD, CD, Bluray, etc. storing the software and/or firmware. Further still, the example image sensor 204 of FIG. 3 may include one or more elements, processes and/or devices in addition to, or instead of, those illustrated in FIG. 3, and/or may include more than one of any or all of the illustrated elements, processes and devices.

Figure 4:
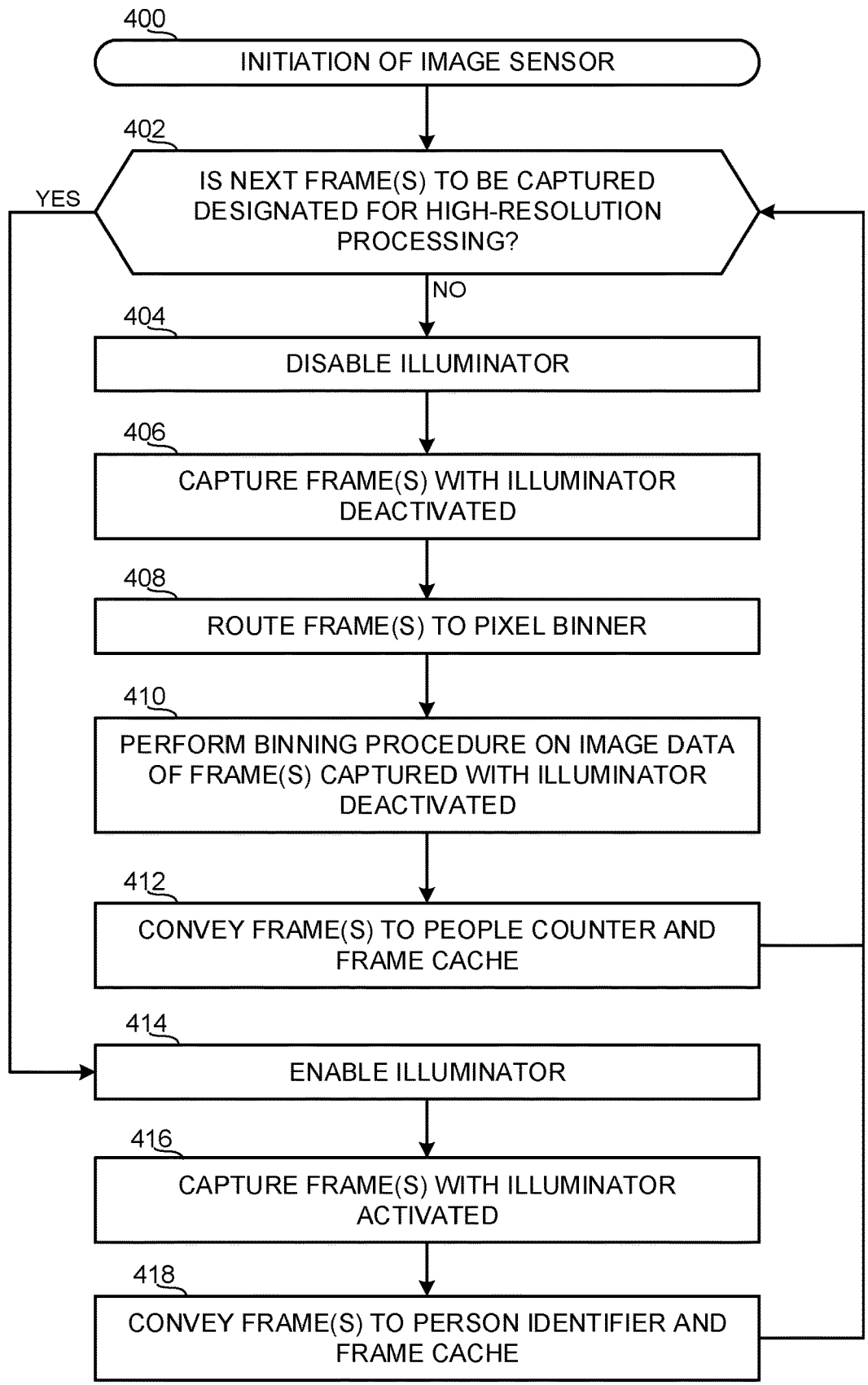
FIG. 4 is a flowchart illustrating example machine readable instructions that may be executed to implement the example image sensor of FIGS. 1, 2 and/or 3.

FIG. 4 is a flowchart representative of example machine readable instructions for implementing the example image sensor 204 of FIGS. 1, 2 and/or 3. In this example, the machine readable instructions comprise a program for execution by a processor such as the processor 512 shown in the example processing system 500 discussed below in connection with FIG. 5. The program may be embodied in software stored on a tangible computer readable medium such as a CD-ROM, a floppy disk, a hard drive, a digital versatile disk (DVD), a BluRay disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example image sensor 204 may alternatively be used. For example, the order of execution of the blocks may be changed, and/or some of the blocks described may be changed, eliminated, or combined.

As mentioned above, the example processes of FIG. 4 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4 begins with an initiation of the example image sensor 204 of FIG. 3 (block 400). In the illustrated example, the initiation of the image sensor 204 corresponds to an initiation of a monitoring session of the example exposure environment 100 of FIG. 1. The example resolution determiner 300 determines whether the next frame(s) to be captured are to be subjected to processing that demands high-resolution image data (block 402). In the illustrated example, the amount of frames for which the determination is to be made varies depending on, for example, an adjustable setting and/or a finding of the hi-res trigger 302 regarding previous frame(s). As described above, the determination of the resolution determiner 300 indicates which mode (e.g., majority (e.g., low resolution) mode or minority (e.g., high resolution) mode) in which the image sensor 204 is to operate for the next frame(s). In the illustrated example, the resolution determiner 300 bases the determination on whether the next frame(s) to be captured will undergo a facial recognition process implemented by the example person identifier 207 of FIG. 2. For example, the hi-res trigger 302 of FIG. 3 determines whether a head or face is included in previous frame(s) (e.g., frames(s) obtained from the frame cache 303) capable of providing an identification of a corresponding person.

In the example of FIG. 4, when the resolution determiner 300 determines that the next frame(s) to be captured are not going to be subjected to the facial recognition process (block 402), the example resolution determiner 300 provides an instruction to the illumination controller 304 to disable the illuminator 306 during capture of the next frame(s) (block 404). In such instances, the illumination controller 304 cooperates with the image capturer 308 to capture the next frame(s) with the illuminator 306 deactivated (block 406). While the resulting frames are captured with the high-resolution camera of the image capturer 308, the frames are not lit by the illuminator 306 and, thus, likely to be dark and to have low contrast levels. To increase the contrast levels of the frame(s) captured without use of the illuminator 306, the frame router 310 routes the frame(s) to the pixel binner 312 (block 408). The example frame router 310 of FIG. 3 is aware of which frames were captured without use of the illuminator 306 via the instruction provided thereto by the resolution determiner 300 regarding in which mode (e.g., majority mode or minority mode) the image sensor 204 is operating.

The example pixel binner 312 of FIG. 3 performs a binning procedure (e.g., a 2×2 binning) on the received frame(s) (block 410). As described above, the binning procedure increases the contrast levels of the image data at the expense of the resolution of the image data. The lower resolution is acceptable for the frame(s) captured while in the majority mode because the people counting process(es) for which the majority mode frames are designated does not require high-resolution data, but operates more accurately with higher contrast levels. Having performed the binning procedure on the majority mode frames, the example pixel binner 312 conveys the binned frame(s) to the people counter 206 and the frame cache 303 (block 412). Control returns to block 402.

Referring back to block 402, when the resolution determiner 300 determines that the next frame(s) to be captured are going to be subjected to the facial recognition process, the example resolution determiner 300 provides an instruction to the illumination controller 304 to enable the illuminator 306 during capture of the next frame(s) (block 414). In such instances, the illumination controller 304 cooperates with the image capturer 308 to capture the next frame(s) with the illuminator 306 activated (e.g., emitting light, such as IR light into the exposure environment 100 of FIG. 1) (block 416). The resulting frames are captured with the high-resolution camera of the image capturer 308 and the frames are lit by the illuminator 306. Thus, the minority mode frames are ready for processing by the person identifier 207. Accordingly, the route framer 310 conveys the minority mode frames to the person identifier 207 and the frame cache 303 (block 418). Control returns to block 402.

While the example image sensor of FIGS. 1, 2 and/or 3 is described in the context of an audience measurement device 104 and the generation of exposure data for media content, the example methods, apparatus, and articles of manufacture disclosed herein can be applied to additional or alternative contexts, systems, measurements, applications, programs, etc. That is, the example methods, apparatus, and articles of manufacture disclosed herein can be used in any application to selectively operate an illumination source of an image sensor based on a resolution demand for the resulting frames of image data.

Figure 5:
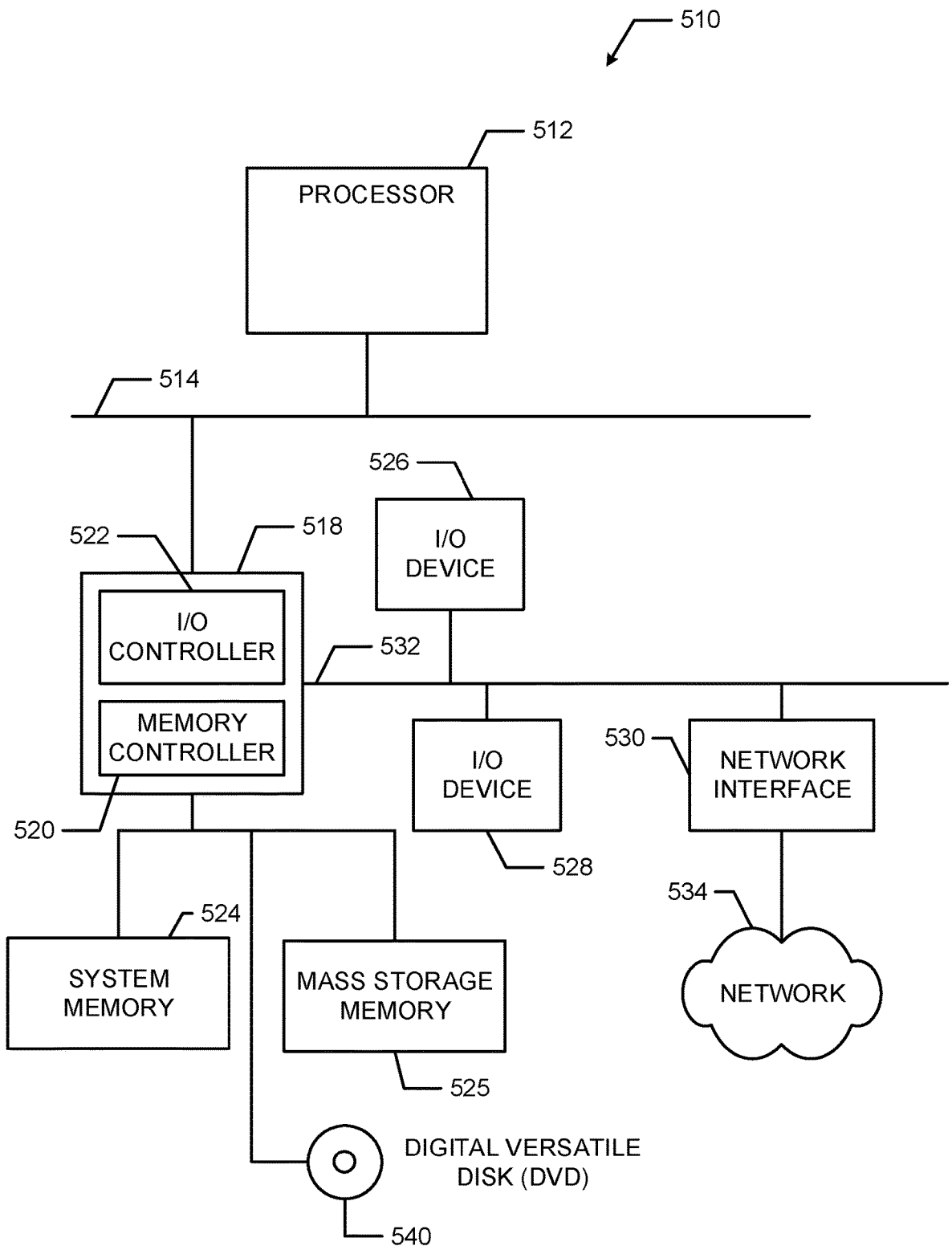
FIG. 5 is a block diagram of an example processing system capable of executing the example machine readable instructions of FIG. 4 to implement the example image sensor of FIGS. 1, 2 and/or 3.

FIG. 5 is a block diagram of an example processor system 510 capable of executing the instructions of FIG. 4 to implement the example image sensor 204 of FIGS. 2 and/or 3. The processor system 510 can be, for example, a server, a personal computer, a mobile phone, a personal digital assistant (PDA), an Internet appliance, a DVD player, a CD player, a digital video recorder, a BluRay player, a gaming console, a personal video recorder, a set-top box, an audience measurement device, or any other type of computing device.

The example processor system 510 of FIG. 5 includes a processor 512 that is coupled to an interconnection bus 514. The processor 512 may be any suitable processor, processing unit, or microprocessor (e.g., one or more Intel® microprocessors from the Pentium® family, the Itanium® family or the XScale® family and/or other processors from other families). The system 510 may be a multi-processor system and, thus, may include one or more additional processors that are identical or similar to the processor 512 and that are communicatively coupled to the interconnection bus 514.

The processor 512 of FIG. 5 is coupled to a chipset 518, which includes a memory controller 520 and an input/output (I/O) controller 522. A chipset provides I/O and memory management functions as well as a plurality of general purpose and/or special purpose registers, timers, etc. that are accessible or used by one or more processors coupled to the chipset 518. The memory controller 520 performs functions that enable the processor 512 to access a system memory 524, a mass storage memory 525, and/or a digital versatile disk (DVD) 540.

In general, the system memory 524 may include any desired type of volatile and/or non-volatile memory such as, for example, static random access memory (SRAM), dynamic random access memory (DRAM), flash memory, read-only memory (ROM), double data rate memory (DDR), etc. The mass storage memory 525 may include any desired type of mass storage device including hard disk drives, optical drives, tape storage devices, etc. The machine readable instructions of FIGS. 5A-5C may be stored in the system memory 524, the mass storage memory 525, and/or the DVD 540.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a digital subscriber line (DSL) modem, a cable modem, a cellular modem, etc. that enables the processor system 510 to communicate with another processor system. The example network interface 530 of FIG. 5 is also communicatively coupled to a network 534, such as an intranet, a Local Area Network, a Wide Area Network, the Internet, etc.

While the memory controller 520 and the I/O controller 522 are depicted in FIG. 5 as separate functional blocks within the chipset 518, the functions performed by these blocks may be integrated within a single semiconductor circuit or may be implemented using two or more separate integrated circuits.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:
1. A device comprising:
an image sensor to observe a first image of a face; and
a logic circuit to:

determine whether the face in the first image is in a first orientation with respect to the image sensor; and when the face in the first image is in the first orientation:

trigger the image sensor to capture a second image of the face; and perform a facial recognition process on the second image, but not on the first image.

2. The device of claim 1, wherein the first image has a first resolution and the second image has a second resolution.

3. The device of claim 2, wherein the second resolution is higher than the first resolution.

4. The device of claim 2, wherein the logic circuit is to determine the first resolution and change a mode of the image sensor to capture the second image with the second resolution based on the determination of the first resolution.

5. The device of claim 1, wherein the device is in an environment and the image sensor is to change a contrast between the face and the environment before capturing the second image.

6. The device of claim 1, further including an infrared light source to project infrared light on the face when the logic circuit triggers the image sensor to capture the second image.

7. The device of claim 1, wherein the device is a handheld device.

8. A device comprising:

means for capturing images of a face;

means for (1) determining whether a face in a first image captured by the means for capturing images is in a first orientation with respect to the means for capturing images and for (2) causing the means for capturing images to capture a second image of the face when the face in the first image is in the first orientation; and means for performing a facial recognition process on the second image that does not perform facial recognition on the first image.

9. The device of claim 8, wherein the first image has a first resolution and the second image has a second resolution.

10. The device of claim 9, wherein the second resolution is higher than the first resolution.

11. The device of claim 9, further including:

means for determining the first resolution; and means for changing a mode of the means for capturing images to capture the second image with the second resolution based on the determination of the first resolution.

12. The device of claim 8, wherein the device is in an environment and the means for capturing images is to change a contrast between the face and the environment before capturing the second image.

13. The device of claim 8, further including means for projecting infrared light on the face when the means for capturing images is to capture the second image.

14. The device of claim 8, wherein the device is a handheld device.

15. A tangible computer readable medium comprising instructions that, when executed, cause a device to at least:

observe a first image of a face;

determine whether the face in the first image is in a first orientation;

capture a second image of the face when the face in the first image is in the first orientation; and perform a facial recognition process on the second image, but not on the first image.

16. The tangible computer readable medium of claim 15, wherein the first image has a first resolution and the second image has a second resolution.

17. The tangible computer readable medium of claim 16, wherein the second resolution is higher than the first resolution.

18. The tangible computer readable medium of claim 15, wherein the instructions further cause the device to:

determine the first resolution; and change a mode to capture the second image with the second resolution based on the determination of the first resolution.

19. The tangible computer readable medium of claim 15, wherein the device is located in an environment and the instructions further cause the device to change a contrast between the face and the environment before causing the device to capture the second image.

20. The tangible computer readable medium of claim 15, wherein the instructions further cause the device to project infrared light on the face when the device is to capture the second image.

* * * * *